(12) United States Patent
Kawasaki et al.

(10) Patent No.: US 12,744,164 B2
(45) Date of Patent: Sep. 22, 2026

(54) ELECTROLYTIC CAPACITOR

(71) Applicant: Panasonic Intellectual Property Management Co., Ltd., Osaka (JP)

(72) Inventors: Takashi Kawasaki, Osaka Fu (JP); Nobuo Sashinaka, Osaka Fu (JP); Yuki Ueda, Osaka Fu (JP); Masayuki Hogiri, Osaka Fu (JP); Takashi Ohbayashi, Osaka Fu (JP); Hitoshi Ishimoto, Hyogo Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 190 days.

(21) Appl. No.: 18/844,330

(22) PCT Filed: Mar. 7, 2023

(86) PCT No.: PCT/JP2023/008520
§ 371 (c)(1),
(2) Date: Sep. 5, 2024

(87) PCT Pub. No.: WO2023/171657
PCT Pub. Date: Sep. 14, 2023

(65) Prior Publication Data

US 2025/0174413 A1 May 29, 2025

(30) Foreign Application Priority Data

Mar. 9, 2022 (JP) ................................ 2022-036342

(51) Int. Cl.
*H01G 9/052* (2006.01)
*H01G 9/00* (2006.01)
(Continued)

(52) U.S. Cl.
CPC .......... *H01G 9/052* (2013.01); *H01G 9/0036* (2013.01); *H01G 9/028* (2013.01); *H01G 9/07* (2013.01); *H01G 9/15* (2013.01); *H01G 2009/05* (2013.01)

(58) Field of Classification Search
CPC ...... H01G 9/0036; H01G 9/028; H01G 9/052; H01G 9/07; H01G 9/15; H01G 2009/05
See application file for complete search history.

(56) References Cited

U.S. PATENT DOCUMENTS 6,151,205 A 11/2000 Kobayashi et al.
11,270,847 B1 3/2022 Inazawa
(Continued)

FOREIGN PATENT DOCUMENTS

JP H11-087177 A 3/1999
JP 2009-508341 A 2/2009

OTHER PUBLICATIONS

International Search Report dated May 23, 2023 issued in International Patent Application No. PCT/JP2023/008520, with English translation.

*Primary Examiner* — Nathan Milakovich
(74) *Attorney, Agent, or Firm* — RIMON P.C.

(57) ABSTRACT

An electrolytic capacitor includes; an anode body including a porous body, a dielectric layer; and a solid electrolyte layer that fills in pores of the porous body. A filling rate R of the solid electrolyte layer in the porous body decreases from an outer surface toward the center. A shortest distance D from an outer surface to the center, and a distance $X_{50}$ from the outer surface of the porous body when the filling rate R is 50% satisfy a specific relationship. When CV value of the porous body is less than 100,000 μF·V/g, $0.1\ D \leq X_{50} < 0.7\ D$ is satisfied. When CV value of the porous body is 100,000 μF·V/g or more and less than 150,000 μF·V/g, 0.05
(Continued)

$D \leq X_{50} < 0.3$ D is satisfied. When CV value of the porous body is 150,000 μF·V/g or more, $0.03\ D \leq X_{50} < 0.2$ D is satisfied.

12 Claims, 4 Drawing Sheets

(51) Int. Cl.

| | |
|---|---|
| ***H01G 9/028*** | (2006.01) |
| ***H01G 9/04*** | (2006.01) |
| ***H01G 9/07*** | (2006.01) |
| ***H01G 9/15*** | (2006.01) |

(56) References Cited

U.S. PATENT DOCUMENTS

| | | | | |
|---|---|---|---|---|
| 2008/0005878 | A1 | 1/2008 | Merker et al. | |
| 2020/0365329 | A1 | 11/2020 | Petrzilek et al. | |
| 2022/0351914 | A1* | 11/2022 | Usa | H01G 9/10 |
| 2024/0194416 | A1* | 6/2024 | Onozaki | H01G 9/15 |

* cited by examiner

ELECTROLYTIC CAPACITOR

CROSS-REFERENCE TO RELATED APPLICATIONS

This application is the U.S. National Phase under 35 U.S.C. § 371 of International Patent Application No. PCT/JP2023/008520, filed on Mar. 7, 2023, which in turn claims the benefit of Japanese Patent Application No. 2022-036342, filed on Mar. 9, 2022, the entire disclosures of which Applications are incorporated by reference herein.

TECHNICAL FIELD

The present disclosure relates to an electrolytic capacitor.

BACKGROUND ART

In recent years, electrolytic capacitors having low equivalent series resistances (ESR) and excellent frequency characteristics have been developed. An electrolytic capacitor includes a porous body containing a valve metal, a dielectric layer that covers the porous body, and a solid electrolyte layer that is filled in the pores of the porous body and covers the dielectric layer.

Patent Literature 1 proposes a solid electrolytic capacitor including a capacitor element that includes a conductive polymer compound layer having a thickness of at least 0.02 μm or more and 0.14 μm or less at a central portion of the capacitor element. Patent Literature 1 also proposes that, in the above-described solid electrolytic capacitor, the difference between the thickness of the conductive polymer compound layer at the central portion of the capacitor element and the thickness of the conductive polymer compound layer in the vicinity of an outer surface of the capacitor element is 0.08 μm or less.

CITATION LIST

Patent Literature

Patent Literature 1: Japanese Laid-Open Patent Publication No. H11-87177

SUMMARY OF INVENTION

Technical Problem

In recent years, there has been a need to reduce the ESRs of electrolytic capacitors. With the electrolytic capacitor described in Patent Literature 1, an increase in the ESR under a high-temperature environment can be suppressed, but the reduction in the ESR of the electrolytic capacitor is still insufficient.

Solution to Problem

An aspect of the present disclosure relates to an electrolytic capacitor including: an anode body including a porous body containing a valve metal, and a dielectric layer that covers the porous body; and a solid electrolyte layer that is filled in pores of the porous body and covers the dielectric layer, wherein a CV value of the porous body is less than 100,000 μF·V/g, a filling rate R of the solid electrolyte layer in the porous body decreases from an outer surface toward a center of the porous body, and a shortest distance D from the outer surface to the center of the porous body, and a distance X from the outer surface of the porous body when the filling rate R of the solid electrolyte layer is 50% satisfy a relationship of $0.1\ D \leq X < 0.7\ D$.

Another aspect of the present disclosure relates to an electrolytic capacitor including: an anode body including a porous body containing a valve metal, and a dielectric layer that covers the porous body; and a solid electrolyte layer that is filled in pores of the porous body and covers the dielectric layer, wherein a CV value of the porous body is 100,000 μF·V/g or more and less than 150,000 μF·V/g, a filling rate R of the solid electrolyte layer in the porous body decreases from an outer surface toward a center of the porous body, and a shortest distance D from the outer surface to the center of the porous body, and a distance X from the outer surface of the porous body when the filling rate R of the solid electrolyte layer is 50% satisfy a relationship of $0.05\ D \leq X < 0.3\ D$.

Still another aspect of the present disclosure relates to an electrolytic capacitor including: an anode body including a porous body containing a valve metal, and a dielectric layer that covers the porous body; and a solid electrolyte layer that is filled in pores of the porous body and covers the dielectric layer, wherein a CV value of the porous body is 150,000 μF·V/g or more, a filling rate R of the solid electrolyte layer in the porous body decreases from an outer surface toward a center of the porous body, and a shortest distance D from the outer surface to the center of the porous body, and a distance X from the outer surface of the porous body when the filling rate R of the solid electrolyte layer is 50% satisfy a relationship of $0.03\ D \leq X < 0.2\ D$.

Advantageous Effects of Invention

According to the present disclosure, it is possible to provide a low-ESR electrolytic capacitor.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENT

Figure 1:
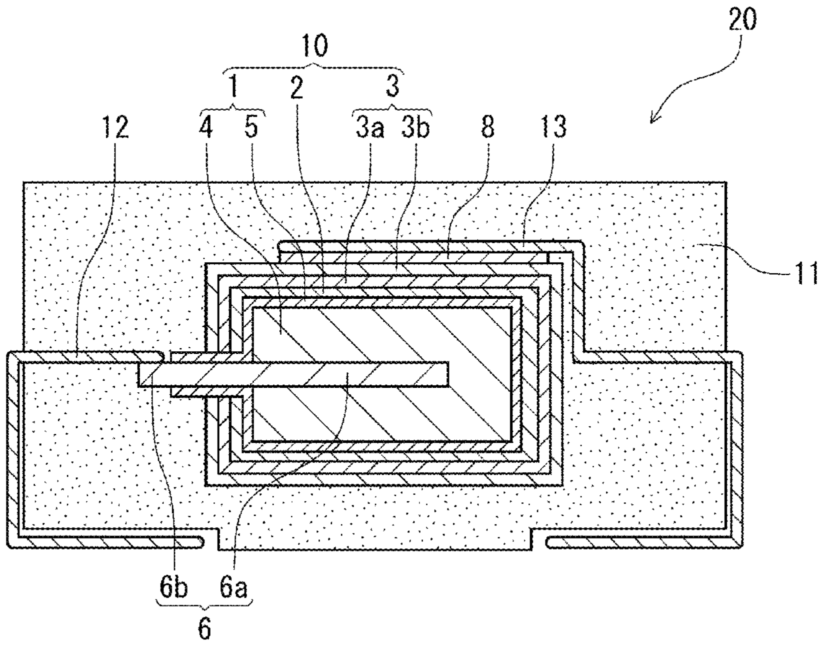
FIG. 1 A cross-sectional view schematically showing an electrolytic capacitor according to an embodiment of the present disclosure.

In the following, an embodiment of the present disclosure will be described by way of examples. However, the present disclosure is not limited to the examples described below. Although examples of specific numerical values and materials may be given in the following description, other numerical values and materials may be used as long as the effects of the present disclosure can be achieved. In the present specification, the expression "from a numerical value A to a numerical value B" includes the numerical value A and the numerical value B, and can be read as "a numerical value A or more and a numerical value B or less". In the following description, when examples of the lower and upper limits of a numerical value related to a specific physical property, condition, or the like are given, any one of the given examples of the lower limit and any one of the given examples of the upper limit can be freely combined as long as the lower limit is not equal to or not greater than the upper limit. When a plurality of materials are given as examples, one of the materials may be selected and used alone, or two or more of the materials may be used in combination.

An electrolytic capacitor includes an anode body having a porous body containing a valve metal and a dielectric layer that covers the porous body, and a solid electrolyte layer that is filled in the pores of the porous body and covers the dielectric layer. Hereinafter, the anode body and the solid electrolyte layer (or the anode body, the solid electrolyte layer, and a cathode layer described later) together are also referred to as a "capacitor element". Usually, a filling rate R of the solid electrolyte layer in the porous body decreases from the outer surface toward the center of of the porous body. That is, the filling rate R decreases as a distance X from the outer surface of the porous body increases.

As a result of examining the relationship between the filling rate R in the depth direction of the porous body and the ESR, the present inventors obtained the following findings.

The degree of influence on the ESR by the filling rate R on the surface side of the porous body differs depending on the CV value of the porous body. The larger the CV value, the smaller the degree of influence on the ESR by the filling rate R in a deep portion of the porous body, and the larger the degree of influence on the ESR by the filling rate R in a surface portion of the porous body. Also, the higher the measurement frequency, the smaller the degree of influence on the ESR by the filling rate R in the deep portion of the porous body, and the larger the degree of influence on the ESR by the filling rate R in the surface portion.

When the solid electrolyte layer is formed slowly with a reduced polymerization reaction rate, in particular, when electrolytic polymerization suitable for precision control of the polymerization rate is performed, the filling rate R can be increased from the surface portion to the deep portion of the porous body, but on the other hand, the polymerization time becomes longer. The longer polymerization time results in degradation of the polymerization liquid due to, for example, formation of an oligomer, thus reducing the conductivity of the formed solid electrolyte and increasing the ESR.

The present inventors conducted intensive studies based on the obtained findings. As a result, the inventors has found that, when a shortest distance D from the outer surface to the center of the porous body and a distance $X_{50}$ satisfy the following relationship (i), (ii), or (iii), the solid electrolyte layer can be efficiently filled in the pores of the porous body, thus making it possible to reduce the ESR both in a low-frequency range and a high-frequency range. Note that the distance $X_{50}$ is a distance X from the outer surface of the porous body when the filling rate R of the solid electrolyte layer is 50%.

(i) 0.1 D≤$X_{50}$<0.7 D when the CV value of the porous body is less than 100,000 μF·V/g (ii) 0.05 D≤$X_{50}$<0.3 D when the CV value of the porous body is 100,000 μF·V/g or more and less than 150,000 μF·V/g (iii) 0.03 D≤$X_{50}$<0.2 D when the CV value of the porous body is 150,000 μF·V/g or more Hereinafter, a region in which the distance X from the outer surface of the porous body is $X_{50}$ or less (a region in which the filling rate R is 50% or more) is also referred to as a "first region". A region in which the distance X from the porous body to the outer surface is greater than $X_{50}$ (a region in which the filling rate R is less than 50%) is also referred to as a "second region".

When the CV value is high, the filling rate R in the deep portion of the porous body has a small degree of influence on the ESR, and the increase in the ESR tends to be easily controlled even when the first region is small. Appropriately forming the first region according to the CV value can reduce the formation time of the solid electrolyte layer including the conductive polymer, thus suppressing a reduction in the conductivity of the solid electrolyte layer due to an increase in the formation time. Accordingly, an electrolytic capacitor having a low ESR and a high capacitance can be realized at low cost.

At a high measurement frequency (e.g., 500 kHz), the degree of influence on the ESR by the filling rate R in the deep portion of the porous body is smaller than that at a low measurement frequency (e.g., 100 kHz), and the ESR is less likely to be increased even when the first region is small. Accordingly, reducing the formation time of the solid electrolyte layer is likely to provide the effect of suppressing an increase in the ESR and the cost that may be caused by a long formation time.

When the $X_{50}$ in (i) is 0.1 D or more, the first region is appropriately formed, and a conductive path is efficiently formed by the solid electrolyte layer, so that the ESR is significantly reduced. When the $X_{50}$ in (ii) is 0.05 D or more, and when the $X_{50}$ in (iii) is 0.03 D or more, the ESR is also significantly reduced in the same manner.

When the $X_{50}$ in (i) is less than 0.7 D, the polymerization time required to form the solid electrolyte layer can be reduced, so that degradation of the polymerization liquid due to an increase in the polymerization time is suppressed, thus suppressing a reduction in the conductivity of the solid electrolyte due to degradation of the polymerization liquid and an increase in the ESR resulting therefrom. When the $X_{50}$ in (ii) is less than 0.3 D, and when the $X_{50}$ in (iii) is less than 0.2 D, an increase in the ESR is also suppressed in the same manner.

In the case of (i) above, the CV value of the porous body may be 70,000 μF·V/g or more and less than 100,000 μF·V/g. In this case, the filling rate R of the solid electrolyte layer when the distance X from the outer surface of the porous body is 0.1 D may be 50% or more and 80% or less. In this case, the filling rate R of the solid electrolyte layer when the distance X from the outer surface of the porous body is 0.7 D may be greater than 16% and 48% or less.

In the case of (ii) above, the filling rate R of the solid electrolyte layer when the distance X from the outer surface of the porous body is 0.05 D may be 50% or more and 83% or less. In this case, the filling rate R of the solid electrolyte layer when the distance X from the outer surface of the porous body is 0.3 D may be greater than 13% and 44% or less.

In the case of (iii) above, the filling rate R of the solid electrolyte layer when the distance X from the outer surface of the porous body is 0.03 D may be 56% or more and 83% or less. In this case, the filling rate R of the solid electrolyte layer when the distance X from the outer surface of the porous body is 0.2 D may be 14% or more and 41% or less. In the case of (iii) above, the CV value may be 150,000 μF V/g or more and 350,000 μF·V/g or less, or 150,000 μF·V/g or more and 200,000 μF·V/g or less.

From the viewpoint of ease of reducing the formation time of the solid electrolyte layer and the ESR, when the CV value of the porous body is less than 100,000 μF·V/g, the distance $X_{50}$ may be 0.1 D or more and 0.69 D or less, 0.1 D or more and less than 0.5 D, or 0.1 D or more and less than 0.4 D. From the same viewpoint, when the CV value of the porous body is 100,000 μF·V/g or more and less than 150,000 μF·V/g, the distance $X_{50}$ may be 0.05 D or more and 0.29 D or less, or 0.05 D or more and less than 0.2 D. From the same viewpoint, when the CV value of the porous body is 150,000 μF·V/g or more, the distance $X_{50}$ may be 0.03 D or more and 0.19 D or less, or 0.03 D or more and less than 0.1 D.

The filling rate R (%) of the solid electrolyte layer means the ratio of the area of the solid electrolyte layer in one region (e.g., a region with an area of 5 $\mu m^2$ to 30 $\mu m^2$) in a cross section (a cross section including the length direction of the shortest distance D) of the anode body as observed with an electron microscope, to the area of voids (pores of the anode body) in the region. The area of the voids in the region means a value obtained by subtracting the area of the anode body (the total area of the porous body and the dielectric layer) in the region from the overall area of the region. As the electron microscope, it is possible to use a scanning electron microscope (SEM) or a transmission electron microscope (TEM). The filling rate R of the solid electrolyte layer at a distance X from the outer surface of the porous body means the filling rate R in one region in which the depth of the distance X is located in the vicinity of the center of that region.

The filling rate R (%) of the solid electrolyte layer can be determined by the following method.

The electrolytic capacitor is disassembled to remove the capacitor element therefrom, and the capacitor element is processed using a cross section polisher (CP), to obtain a sample cross section (cross section of the anode body). The sample cross section is observed with a SEM or a TEM, and an image (e.g., magnification: 20000× to 40000×) showing one region (hereinafter referred to as a measurement region) of the cross section is obtained. Using the image, an overall area S0 (e.g., 5 $\mu m^2$ to 30 $\mu m^2$) of the measurement region, an area S1 of the anode body (the total area of the porous body and the dielectric layer) in the measurement region, and an area S2 of the solid electrolyte layer in the measurement region are determined.

Using S0, S1, and S2 determined as described above, the filling rate (%) is determine by the following expression. Note that the value obtained by subtracting S1 from S0 represents the area of the voids in the measurement region.

$$\text{Filling rate } R = \{S2/(S0 - S1)\} \times 100$$

The distance $X_{50}$ can be determined by the following method.

The filling rates R are respectively determined at measurement points at distances X from the outer surface of the porous body of 0.01 D, 0.03 D, 0.05 D, 0.1 D, 0.2 D, 0.3 D, 0.4 D, 0.5 D, 0.7 D, and 0.9 D. The filling rate R at a distance X of 0.01 D is determined by arbitrarily selecting several points (e.g., three to five points) from the measurement region in which the distance X=0.01 D, respectively measuring the filling rates R at the points, and calculating the average value thereof. Note that in the measurement region in which the distance X=0.01 D, a depth of a distance X=0.01 D is included in the vicinity of the center of the measurement region. The filling rates R are also respectively determined in the same manner for cases where the distance X is other than 0.01 D. At this time, the measurement regions in which X=0.01 D, 0.03 D, 0.05 D, 0.1 D, 0.2 D, 0.3 D, 0.4 D, 0.5 D, 0.7 D, and 0.9 D are set so as not to overlap each other.

The filling rates R are respectively determined at the measurement points at the distances X, and confirms that the larger the distance X, the smaller the filling rate R becomes. Then, a maximum value M1 of the measurement points at distances X at which the filling rate R is 50% or more, and a minimum value M2 of the measurement points at distances X at which the filling rate R is less than 50% are determined. From this, it can be seen that the distance X ($X_{50}$) at which the filling rate R is 50% is M1 or more and less than M2.

The conductivity of the solid electrolyte layer may be, for example, 50 S/cm or more and 300 S/cm or less, or 60 S/cm or more and 200 S/cm or less.

The conductivity of the solid electrolyte layer can be determined by the following method.

The electrolytic capacitor is disassembled to remove the capacitor element therefrom, and the components of the solid electrolyte layer are analyzed. In the case of forming the solid electrolyte layer using a treating liquid, the components of the treating liquid may be analyzed. As the analysis method, it is possible to use transmission electron microscope (TEM)-electron energy loss spectroscopy (EELS), nuclear magnetic resonance spectroscopy (NMR), Raman spectrometry, and the like.

Based on the analysis result, a sample film (e.g., thickness: 20 μm to 40 μm) containing the same components as the solid electrolyte layer, and the conductivity of the sample film is determined as the conductivity of the solid electrolyte layer. As the apparatuses for measuring the conductivity, it is possible to use Loresta-GX and a PSP probe manufactured by Nittoseiko Analytech Co., Ltd.

(Porous Body)

The porous body contains a valve metal. As the valve metal, it is possible to use aluminum (Al), titanium (Ti), tantalum (Ta), niobium (Nb), zirconium (Zr), hafnium (Hf), and the like.

As the porous body, it is possible to use, for example, a sintered molded body of raw material particles (raw material powder) of a valve metal. The particles may be particles of a valve metal, particles of an alloy containing a valve metal, or particles of a compound containing a valve metal. One kind of the particles may be used, or two or more kinds of the particles may be used as a mixture.

The porous body can be obtained, for example, by pressure-molding raw material particles into a predetermined shape, to obtain a molded body, and sintering the molded body. For example, the anode wire may be disposed at a predetermined position of a mold, into which raw material particles may be introduced, and the raw material particles may be pressure-molded to obtain a molded body. By sintering the molded body, a porous body with a part of the anode wire embedded therein may be obtained. Usually, the porous body is a rectangular parallelepiped.

The average particle diameter of the raw material particle is, for example, preferably 0.05 μm or more and 0.5 μm or less. Note that the average particle diameter as used herein refers to a median diameter (D50) in a volume particle size distribution determined using a laser diffraction particle size distribution measurement apparatus.

The CV value of a porous body can be represented by the mathematical product of a chemical conversion voltage and a measured capacitance (capacitance per unit mass excluding the anode wire) when the porous body is subjected to chemical conversion in an aqueous phosphoric acid solution (concentration: 0.02 mass %) at a chemical conversion voltage of 10 V and a temperature of 60° C. for two hours, followed by measuring the capacitance at a frequency of 120 Hz.

The raw material particles used for the formation of the porous body themselves have a large number of fine projections and recesses. When the surface areas of the raw material particles themselves are large, a porous body having a small pore diameter and a large surface area is likely to be obtained, and such a porous body tends to provide a large CV value.

The most frequent pore size of a porous body having a CV value of 70,000 μF·V/g or more and less than 100,000 μF·V/g is, for example, 0.24 μm or more and 0.37 μm or less. The most frequent pore size of a porous body having a CV value of 100,000 μF·V/g or more and less than 150,000 μF·V/g is, for example, 0.17 μm or more and 0.26 μm or less. The most frequent pore size of a porous body having a CV value of 150,000 μF·V/g or more is, for example, 0.10 μm or more and 0.21 μm or less. Note that the most frequent pore size as used herein is the most frequent pore size in a volume-based pore size distribution as measured with a mercury porosimeter. The anode body can be obtained by forming a thin oxide film on a surface of the porous body by chemical conversion treatment or the like, and it can be said that the most frequent pore size of the anode body has substantially the same value as the most frequent pore size of the porous body.

The anode body may include a rod-shaped anode wire partially embedded in the porous body. A part of the anode wire may be embedded in the porous body so as to pass through the center of the porous body. When the porous body is a rectangular parallelepiped, the anode wire is planted from one end face of the rectangular parallelepiped. The anode wire may contain a valve metal. A part of the anode wire is embedded in the porous body, and the remaining part thereof projects from the porous body. The remaining part is connected to the anode lead terminal by welding or the like.

(Dielectric Layer)

The dielectric layer is formed so as to cover the outer surface of the porous body and the inner wall surfaces of the pores of the porous body. The dielectric layer can be formed, for example, by subjecting the porous body to chemical conversion treatment, to grow an oxide film on a surface of the porous body. The chemical conversion treatment may be performed by immersing the porous body in a chemical formation solution, to anodize the surface of the porous body. Alternatively, the porous body may be heated under an atmosphere containing oxygen, to oxidize the surface of the porous body.

(Solid Electrolyte Layer)

The solid electrolyte layer is disposed so as to cover at least a part of the dielectric layer. The solid electrolyte layer may be filled in the pores of the porous body via the dielectric layer, and be formed on the outer surface of the porous body. The solid electrolyte layer may be a laminate of two or more different solid electrolyte layers.

The solid electrolyte layer contains a conductive polymer. The conductive polymer may be a x-conjugated polymer, and examples of the conductive polymer include polypyrrole, polythiophene, polyaniline, and derivatives thereof. These may be used alone or in a combination of two or more. The conductive polymer may be a copolymer of two or more monomers. Note that a derivative of a conductive polymer refers to a polymer including a conductive polymer as a basis skeleton thereof. Examples of the derivative of polythiophene include poly(3,4-ethylenedioxythiophene) (PEDOT).

A dopant may be added to the conductive polymer. That is, the solid electrolyte layer may contain a conductive polymer and a dopant. The conductive polymer may be contained in the solid electrolyte layer while being doped with dopant. The dopant can be selected according to the conductive polymer, and a known dopant may be used. Examples of the dopant include benzene sulfonic acid, alkylbenzene sulfonic acid, naphthalene sulfonic acid, alkylnaphthalene sulfonic acid, polystyrene sulfonic acid (PSS), and salts thereof. The solid electrolyte layer contains, for example, PEDOT doped with PSS.

The solid electrolyte layer containing the conductive polymer can be formed, for example, by impregnating a first treating liquid containing a monomer (or oligomer) into a porous body (anode body) having a dielectric layer formed on a surface thereof, and thereafter polymerizing the monomer (or oligomer) by electrolytic polymerization or chemical polymerization. In the case of chemical polymerization, the first treating liquid contains, for example, a monomer (or an oligomer), an oxidizing agent, and a solvent (or a dispersing medium). Examples of the monomer include 3,4-ethylenedioxythiophene (EDOT) and pyrrole. The first treating liquid may contain a dopant.

The solid electrolyte layer may also be formed by impregnating a second treating liquid containing a conductive polymer into a porous body (anode body) having a dielectric layer formed on a surface thereof, and performing drying. The second treating liquid contains, for example, a conductive polymer, a solvent (or a dispersing medium), and optionally a dopant.

The filling rate R of the solid electrolyte layer in the depth direction of the porous body can be adjusted, for example, by changing the conditions (the current value, the polymerization time, the composition of the electrolyte, the temperature, etc.) for electrolytic polymerization, the conditions (the composition of the first treating liquid, the polymerization time, the temperature, etc.) for chemical polymerization. For electrolytic polymerization, the reaction rate be easily controlled by controlling the current value, and the filling rate can be easily controlled.

The filling rate R of the solid electrolyte layer in the depth direction of the porous body may be adjusted by combining the formation of a solid electrolyte layer by electrolytic polymerization and the formation of a solid electrolyte layer by chemical polymerization. Also, the filling rate R of the solid electrolyte layer in the depth direction of the porous body may be adjusted by combining the formation of a solid electrolyte layer using the first treating liquid and the formation of a solid electrolyte layer using the second treating liquid.

(Others)

The capacitor element may include a cathode layer that covers at least a part of the solid electrolyte layer. The electrolytic capacitor may include an anode lead terminal and a cathode lead terminal that are electrically connected to the capacitor element, and an exterior resin disposed around the capacitor element. The cathode lead terminal is connected to the cathode part with the conductive member interposed therebetween. The anode lead terminal is connected to an end portion of the anode wire that projects from the porous body. There is no particular limitation on the shape, size, and the like of the capacitor element, and any known capacitor element or a capacitor element having a configuration similar thereto may be used.

(Cathode Layer)

The cathode layer may include a carbon layer formed on the solid electrolyte layer, and a metal paste layer formed on the carbon layer. The carbon layer may be formed of a conductive carbon material such as graphite, and a resin. The metal paste layer may be formed of metal particles (e.g., silver particles) and a resin, or may be formed of a known silver paste, for example.

(Conductive Member)

The cathode layer is connected to a connection part of the cathode lead terminal by the conductive member. That is, the cathode layer (cathode part) is electrically connected to the cathode lead terminal. The conductive member is formed of a conductive material. The conductive member may be formed using a material containing metal particles (e.g., silver particles) and a resin, or may be formed using a known metal paste (e.g., a silver paste), for example. The conductive member is formed by heating a metal paste. Note that the conductive member may be composed of a plurality of conductive layers of different kinds.

(Exterior Resin)

The exterior resin is disposed around the capacitor element such that the capacitor element is not exposed on the surface of the electrolytic capacitor. Furthermore, the exterior resin insulates the anode lead terminal and the cathode lead terminal from each other. A known exterior resin used for electrolytic capacitors may be used as the exterior resin. For example, the exterior resin may be formed using an insulating resin material used for sealing capacitor elements. The exterior resin may be formed by accommodating the capacitor element in a mold, introducing an uncured thermosetting resin and a filler into the mold, followed by curing using transfer molding, compression molding, or the like.

Examples of the exterior resin include an epoxy resin, a phenol resin, a silicone resin, a melamine resin, a urea resin, an alkyd resin, a polyurethane, a polyimide, and an unsaturated polyester. The exterior resin may contain a substance (an inorganic filler, etc.) other than a resin.

(Cathode Lead Terminal)

A part of the cathode lead terminal is exposed from the exterior resin, and used as a cathode external terminal. Any material that can be used as the material of a cathode lead terminal of an electrolytic capacitor may be used as the material of the cathode lead terminal. For example, a known material of cathode lead terminals used for electrolytic capacitors may be used. The cathode lead terminal may be formed by working a metal sheet (including a metal plate and a metal foil) made of a metal (copper, a copper alloy, etc.) by a known metalworking method.

(Anode Lead Terminal)

A parr of the anode lead terminal is exposed from the exterior resin, and used as an anode external terminal. Any material that can be used as the material of a cathode lead terminal of an electrolytic capacitor may be used as the material of the cathode lead terminal. For example, a known material of anode lead terminals used for electrolytic capacitors may be used. The anode lead terminal may be formed by working a metal sheet (including a metal plate and a metal foil) made of a metal (copper, a copper alloy, etc.) by a known metalworking method.

Figure 2:
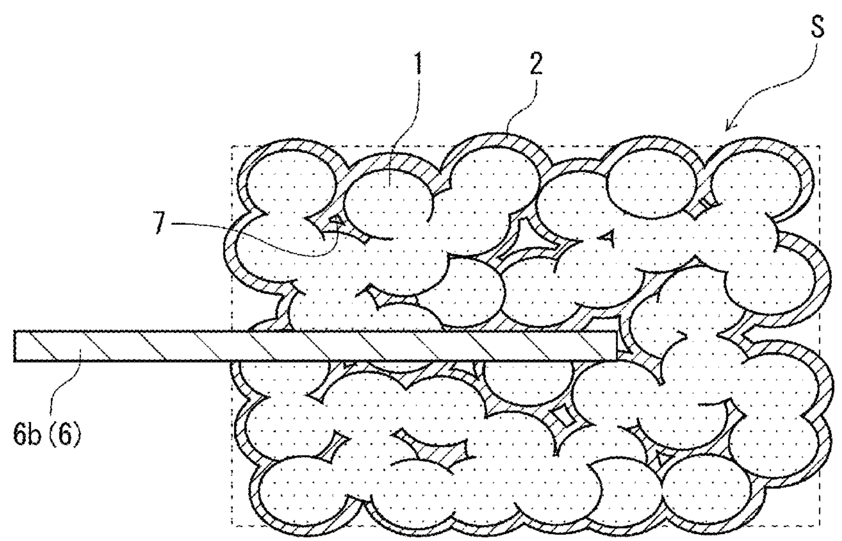
FIG. 2 A cross-sectional view schematically showing an anode body having a solid electrolyte layer formed on a surface thereof.
Figure 3:
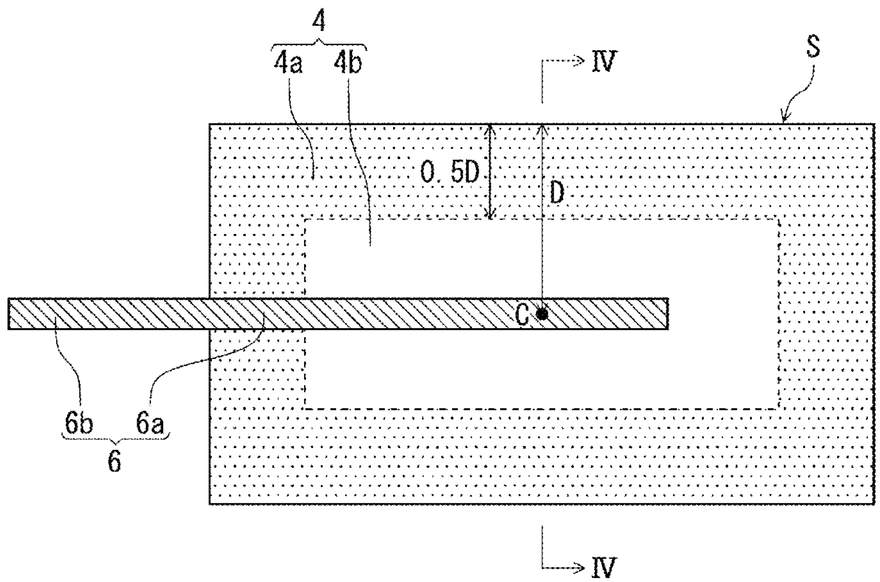
FIG. 3 A cross-sectional view schematically showing an example of a porous body.
Figure 4:
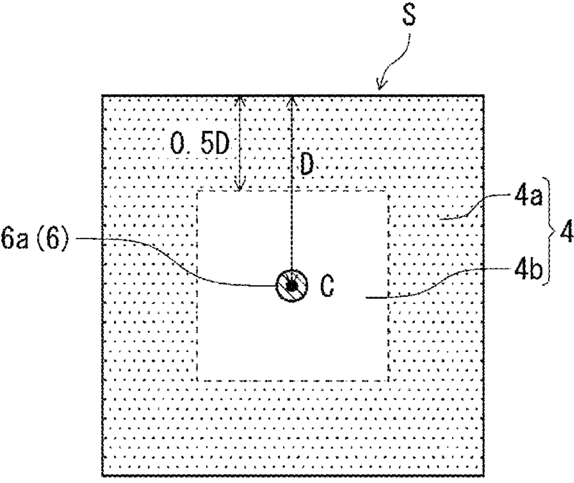
FIG. 4 A cross-sectional view taken along the line IV-IV in FIG. 3.

FIG. 1 is a cross-sectional view schematically showing an example of the electrolytic capacitor according to the present embodiment. FIG. 2 is a cross-sectional view schematically showing an anode body having a solid electrolyte layer formed on a surface thereof. FIG. 3 is a cross-sectional view schematically showing a porous body. FIG. 4 is a cross-sectional view taken along the line IV-IV in FIG. 3. FIGS. 3 and 4 are cross-sectional views including a center C of the porous body. Although FIGS. 3 and 4 show a case where $X_{50}$=0.5 D as an example, the electrolytic capacitor according to the present embodiment is not limited thereto. Note that that the drawings are schematically shown, and the ratio and the like of the dimensions (length, width, thickness, etc.) of the constituent elements are not necessarily identical to the actual ratio and the like.

An electrolytic capacitor 20 includes a capacitor element 10, an exterior resin 11 that seals the capacitor element 10, and an anode lead terminal 12 and a cathode lead terminal 13 that are electrically connected to the capacitor element 10. A part of the anode lead terminal 12 and a part of the cathode lead terminal 13 are each exposed from the exterior resin 11. A part of the anode lead terminal 12 and a part of the cathode lead terminal 13 are each covered by the exterior resin 11 together with the capacitor element 10.

The capacitor element 10 includes an anode body 1, a solid electrolyte layer 2 formed on the anode body 1, and a cathode layer 3 formed on the solid electrolyte layer 2. The anode body 1 includes a porous body 4 containing a valve metal, and a dielectric layer 5 that covers the porous body 4. The dielectric layer 5 is formed so as to cover an outer surface S of the porous body 4 and inner wall surfaces of pores 7. The anode body 1 has substantially the same porous shape as the porous body 4.

The porous body 4 has a substantially rectangular parallelepiped shape, and has six side surfaces. A part of the anode wire 6 extends from one side surface of the porous body 4. That is, the anode wire 6 has a first portion **6*a* embedded inside the porous body 4 from one side surface of the porous body 4, and a second portion 6*b* extending from the one side surface of the porous body 4. The second portion 6*b* is joined to the anode lead terminal 12 by welding or the like. In the present embodiment, the first portion 6*a* is embedded in the porous body 4 so as to pass through a center C of the porous body 4, but may be embedded in the porous body 4 so as not to pass through the center C of the porous body 4**.

The solid electrolyte layer 2 is formed so as to cover at least a part of the dielectric layer 5. The solid electrolyte layer 2 is filled in the pores 7 of the porous body 4 (anode body 1). The solid electrolyte layer 2 is formed so as to cover the outer surface S of the porous body 4 and the inner wall surfaces of the pores 7 via the dielectric layer 5.

The filling rate R of the solid electrolyte layer 2 in the porous body decreases from the outer surface S toward the center C of the porous body 4. That is, the filling rate R decreases as a distance X from the outer surface S of the porous body 4 increases. The shortest distance to the center C from the outer surface S of the porous body 4 is denoted by D. The distance X ($X_{50}$) from the outer surface S of the porous body 4 when the filling rate R is 50% is 0.5 D. As shown in FIGS. 3 and 4, the porous body 4 includes a first region **4*a* located on the outer surface side of the porous body 4, and a second region 4*b* other than the first region 4*a*. The first region 4*a* is a region (the hatched portion in FIGS. 3 and 4) in which the distance X from the outer surface S of the porous body 4** is 0.5 D or less, and the filling rate R is 50% or more.

The cathode layer 3 is formed so as to cover a surface of the solid electrolyte layer 2. The cathode layer 3 includes a carbon layer **3*a* formed so as to cover the solid electrolyte layer 2, and a metal paste layer 3*b* formed on a surface of the carbon layer 3*a*. The cathode lead terminal 13 is joined to the cathode layer 3 (metal paste layer 3***b*) with a conductive member 8 interposed therebetween. Ther carbon layer 3*a* contains a conductive carbon material such as graphite, and a resin. The metal paste layer 3*b* contains metal particles (e.g., silver) and a resin. Note that the configuration of the cathode layer 3 is not limited to this configuration. The cathode layer 3 may have any configuration having a current collecting function.

EXAMPLES

Hereinafter, the present disclosure will be specifically described by way of examples and comparative examples. However, the present disclosure is not limited to the following examples.

Examples 1 to 5, Comparative Examples 1 to 2

(Production of Porous Body)

One end of the anode wire was embedded in Ta particles, and the Ta particles were molded into a rectangular parallelepiped shape. Thereafter, the resulting molded body was sintered in vacuum. In this manner, a porous body (Ta sintered body) with a part of the anode wire embedded therein was obtained. The shortest distance D from the outer surface to the center of the porous body was 450 μm. A Ta wire was used as the anode wire.

(Formation of Dielectric Layer)

The porous body with a part of the anode wire embedded therein was subjected to chemical conversion treatment (anodization) to form a dielectric layer (thickness: 22 nm) on a surface of the porous body, thus obtaining an anode body. The dielectric layer was a layer of tantalum oxide ($Ta_2O_5$). The chemical conversion treatment was performed for 2 hours at a chemical conversion voltage of 10 V and a temperature of 60° C., with the porous body placed in 0.02 mass % aqueous phosphoric acid solution. The CV value of the porous body was 70,000 μF·V/g. The CV value was adjusted by the Ta particles (surface area or the like) used in the production process of the porous body.

(Formation of Solid Electrolyte Layer)

A solid electrolyte layer (conductivity: 80 S/cm) containing polypyrrole and a dopant was formed in the pores of the porous body (anode body) having the dielectric layer on the surface thereof. A sulfonate having a naphthalene skeleton was used as the dopant.

The formation of the solid electrolyte layer was performed by electrolytic polymerization. The electrolytic polymerization was performed at 20° C., using a treating liquid containing pyrrole, a dopant, and water. By appropriately adjusting the current value and the polymerization time in the electrolytic polymerization, the filling rates R of the solid electrolyte layer at the respective distances X from the outer surface of the porous body were set to the values shown in Table 1.

TABLE 1

| | Electrolytic capacitor | Filling rate R of solid electrolyte layer (%) X = 0.01 D | X = 0.03 D | X = 0.05 D | X = 0.1 D | X = 0.2 D | X = 0.3 D | X = 0.4 D | X = 0.5 D | X = 0.7 D | X = 0.9 D |
|---|---|---|---|---|---|---|---|---|---|---|---|
| Com Ex. 1 | B1-1 | 85 | 71 | 59 | 40 | 22 | 15 | 13 | 12 | 12 | 12 |
| Example 1 | A1-1 | 89 | 82 | 75 | 62 | 44 | 33 | 27 | 23 | 20 | 19 |
| Example 2 | A1-2 | 90 | 85 | 81 | 71 | 56 | 46 | 39 | 34 | 29 | 26 |
| Example 3 | A1-3 | 91 | 87 | 83 | 75 | 62 | 53 | 47 | 42 | 36 | 33 |
| Example 4 | A1-4 | 91 | 88 | 85 | 78 | 67 | 58 | 52 | 48 | 42 | 39 |
| Example 5 | A1-5 | 91 | 89 | 86 | 80 | 71 | 63 | 58 | 54 | 48 | 44 |
| Com Ex. 2 | B1-2 | 92 | 89 | 87 | 82 | 73 | 66 | 61 | 57 | 51 | 48 |

Note that the filling rates R of the solid electrolyte layer at the respective distances X from the outer surface of the porous body were determined by the above-described method.

(Formation of Cathode Layer)

A dispersion of carbon particles (carbon paste) was applied to the solid electrolyte layer, followed by heating, to form a carbon layer on a surface of the solid electrolyte layer. A metal paste containing silver particles, a binder resin, and a solvent was applied to a surface of the carbon layer, followed by heating, to form a metal paste layer, thus obtaining a cathode layer composed of the carbon layer and the metal paste layer. In this manner, a capacitor element was obtained.

(Production of Electrolytic Capacitor)

A conductive adhesive material serving as a conductive member was applied to the metal paste layer, to join the cathode lead terminal and the metal paste layer to each other. The anode wire and the anode lead terminal were joined by resistance welding. Then, the capacitor element with the lead terminals joined thereto was sealed with an exterior resin. In this manner, an electrolytic capacitor was obtained. In Table 1, A1-1 to A1-5 denote the electrolytic capacitors of Examples 1 to 5, respectively. B1-1 to B1-2 denote the electrolytic capacitors of Comparative Examples 1 to 2, respectively.

[Evaluation]

For each of the electrolytic capacitors obtained as described above, the ESR (hereinafter also referred to as "ESR 1") at a frequency of 100 kHz and the ESR (hereinafter also referred to as "ESR 2") at a frequency of 500 kHz were measured using an LCR meter for 4-terminal measurement under an environment at 20° C.

The results of the evaluation are shown in Table 2. The ESR 1 was shown as a relative value taking the ESR 1 value of the electrolytic capacitor B1-1 of Comparative Example 2 as 100. The ESR 2 was shown as a relative value taking the ESR 2 value of the electrolytic capacitor B1-2 of Comparative Example 2 as 100. Table 2 also shows the formation time of the solid electrolyte layer. The formation time is the polymerization time in the electrolytic polymerization. The formation time was shown as a relative value taking the formation time of Comparative Example 2 as 100.

TABLE 2

| | Electrolytic capacitor | CV value (μF · V/g) | Distance $X_{50}$ | ESR 1 (100 kHz) (relative value) | ESR 2 (500 kHz) (relative value) | Formation time of solid electrolyte layer (relative value) |
|---|---|---|---|---|---|---|
| Com Ex. 1 | B1-1 | 70,000 | 0.05 D or more and less than 0.1 D | 100 | 85 | 2 |
| Example 1 | A1-1 | 70,000 | 0.1 D or more and less than 0.2 D | 79 | 81 | 3 |
| Example 2 | A1-2 | 70,000 | 0.2 D or more and less than 0.3 D | 72 | 80 | 4 |
| Example 3 | A1-3 | 70,000 | 0.3 D or more and less than 0.4 D | 68 | 80 | 5 |
| Example 4 | A1-4 | 70,000 | 0.4 D or more and less than 0.5 D | 66 | 79 | 10 |
| Example 5 | A1-5 | 70,000 | 0.5 D or more and less than 0.7 D | 77 | 87 | 20 |
| Com Ex. 2 | B1-2 | 70,000 | 0.7 D or more and less than 0.9 D | 97 | 100 | 100 |

For the electrolytic capacitors A1-1 to A1 to 5, the formation time of the solid electrolyte layer was short, and both the ESR 1 and the ESR 2 were reduced. For the electrolytic capacitor B1-1, in which the $X_{50}$ was less than 0.1 D, the ESR 1 was significantly increased. For the electrolytic capacitor B1-2, in which the $X_{50}$ was 0.7 or more, the formation time of the solid electrolyte layer was long, and the ESR 2 was significantly increased.

Examples 6 to 8, Comparative Examples 3 to 4

In the formation process of the dielectric layer, the porous body with a part of the anode wire embedded therein was subjected to chemical conversion treatment (anodization), to form a dielectric layer (thickness: 22 nm) on a surface of the porous body, thus obtaining an anode body. The dielectric layer was a layer of tantalum oxide ($Ta_2O_5$). The chemical conversion treatment was performed for 2 hours at a chemical conversion voltage of 10 V and a temperature of 60° C., with the porous body placed in 0.02 mass % aqueous phosphoric acid solution. The CV value of the porous body was 100,000 μF·V/g.

By appropriately adjusting the current value and the polymerization time in the electrolytic polymerization during the formation process of the solid electrolyte layer, the filling rates R of the solid electrolyte layer at the respective distances X from the outer surface of the porous body ware set to the values shown in Table 3.

TABLE 3

| | | Filling rate R of solid electrolyte layer (%) | | | | | | | | | |
|---|---|---|---|---|---|---|---|---|---|---|---|
| | Electrolytic capacitor | X = 0.01 D | X = 0.03 D | X = 0.05 D | X = 0.1 D | X = 0.2 D | X = 0.3 D | X = 0.4 D | X = 0.5 D | X = 0.7 D | X = 0.9 D |
| Com Ex. 3 | B2-1 | 80 | 57 | 42 | 23 | 14 | 13 | 13 | 13 | 13 | 13 |
| Example 6 | A2-1 | 86 | 71 | 59 | 39 | 23 | 18 | 17 | 16 | 16 | 16 |
| Example 7 | A2-2 | 91 | 82 | 74 | 59 | 40 | 30 | 25 | 23 | 21 | 20 |
| Example 8 | A2-3 | 93 | 88 | 83 | 72 | 56 | 44 | 37 | 31 | 25 | 23 |
| Com Ex. 4 | B2-2 | 94 | 90 | 86 | 78 | 65 | 54 | 46 | 40 | 32 | 27 |

Except for the foregoing, electrolytic capacitors A2-1 to A2-3 of Examples 6 to 8 and electrolytic capacitors B2-1 to B2-2 of Comparative Examples 3 to 4 were produced and evaluated in the same manner as in the case of the electrolytic capacitor A1-1 of Example 1.

The results of the evaluation are shown in Table 4. In Table 4, the ESR 1 was shown as a relative value taking the ESR 1 value of the electrolytic capacitor B2-1 of Comparative Example 3 as 100. The ESR 2 was shown as a relative value taking the ESR 2 value of the electrolytic capacitor B2-2 of Comparative Example 4 as 100. Table 4 also shows the formation time of the solid electrolyte layer. The formation time is the polymerization time in the electrolytic polymerization. The formation time was shown as a relative value taking the formation time of Comparative Example 4 as 100.

TABLE 4

| | Electrolytic capacitor | CV value (μF · V/g) | Distance $X_{50}$ | ESR 1 (100 kHz) (relative value) | ESR 2 (500 kHz) (relative value) | Formation time of solid electrolyte layer (relative value) |
|---|---|---|---|---|---|---|
| Com Ex. 3 | B2-1 | 100,000 | 0.03 D or more and less than 0.05 D | 100 | 91 | 2 |
| Example 6 | A2-1 | 100,000 | 0.05 D or more and less than 0.1 D | 86 | 85 | 5 |
| Example 7 | A2-2 | 100,000 | 0.1 D or more and less than 0.2 D | 75 | 82 | 10 |

TABLE 4-continued

| | Electrolytic capacitor | CV value (μF · V/g) | Distance $X_{50}$ | ESR 1 (100 kHz) (relative value) | ESR 2 (500 kHz) (relative value) | Formation time of solid electrolyte layer (relative value) |
|---|---|---|---|---|---|---|
| Example 8 | A2-3 | 100,000 | 0.2 D or more and less than 0.3 D | 79 | 88 | 20 |
| Com Ex. 4 | B2-2 | 100,000 | 0.3 D or more and less than 0.4 D | 92 | 100 | 100 |

(Currently Amended)

For the electrolytic capacitors A2-1 to A2-3, the formation time of the solid electrolyte layer was short, and both the ESR 1 and the ESR 2 were reduced. For the electrolytic capacitor B2-1, in which the $X_{50}$ was less than 0.05 D, the ESR 1 was significantly increased. For the electrolytic capacitor B2-2, in which the $X_{50}$ was 0.3 D or more, the formation time of the solid electrolyte layer was long, and the ESR 2 was increased.

Examples 9 to 11, Comparative Examples 5 to 6

In the formation process of the dielectric layer, the porous body with a part of the anode wire embedded therein was subjected to chemical conversion treatment (anodization), to form a dielectric layer (thickness: 22 nm) on a surface of the porous body, thus obtaining an anode body. The dielectric layer was a layer of tantalum oxide ($Ta_2O_5$). The chemical conversion treatment was performed for 2 hours at a chemical conversion voltage of 10 V and a temperature of 60° C., with the porous body placed in 0.02 mass % aqueous phosphoric acid solution. The CV value of the porous body was 150,000 μF·V/g.

By appropriately adjusting the current value and the polymerization time in the electrolytic polymerization during the formation process of the solid electrolyte layer, the filling rates R of the solid electrolyte layer at the respective distances X from the outer surface of the porous body were set to the values shown in Table 5.

TABLE 5

| | Electrolytic capacitor | Filling rate R of solid electrolyte layer (%) | | | | | | | | | |
|---|---|---|---|---|---|---|---|---|---|---|---|
| | | X = 0.01 D | X = 0.03 D | X = 0.05 D | X = 0.1 D | X = 0.2 D | X = 0.3 D | X = 0.4 D | X = 0.5 D | X = 0.7 D | X = 0.9 D |
| Com Ex. 5 | B3-1 | 72 | 42 | 26 | 13 | 10 | 10 | 10 | 10 | 10 | 10 |
| Example 9 | A3-1 | 80 | 56 | 41 | 22 | 14 | 13 | 13 | 13 | 13 | 13 |
| Example 10 | A3-2 | 86 | 71 | 58 | 38 | 21 | 16 | 15 | 14 | 14 | 14 |
| Example 11 | A3-3 | 91 | 83 | 76 | 61 | 41 | 30 | 23 | 20 | 17 | 15 |
| Com Ex. 6 | B3-2 | 93 | 87 | 82 | 71 | 54 | 42 | 34 | 29 | 23 | 20 |

Except for the foregoing, electrolytic capacitors A3-1 to A3-3 of Examples 9 to 11 and electrolytic capacitors B3-1 to B3-2 of Comparative Examples 5 to 6 were produced and evaluated in the same manner as in the case of the electrolytic capacitor A1-1 of Example 1.

The results of the evaluation are shown in Table 6. In Table 6, the ESR 1 was shown as a relative value taking the ESR 1 value of the electrolytic capacitor B3-1 of Comparative Example 5 as 100. The ESR 2 was shown as a relative value taking the ESR 2 value of the electrolytic capacitor B3-2 of Comparative Example 6 as 100. Table 6 also shows the formation time of the solid electrolyte layer. The formation time is the polymerization time in the electrolytic polymerization. The formation time was shown as a relative value taking the formation time of Comparative Example 6 as 100.

TABLE 6

| | Electrolytic capacitor | CV value (μF · V/g) | Distance $X_{50}$ | ESR 1 (100 kHz) (relative value) | ESR 2 (500 kHz) (relative value) | Formation time of solid electrolyte layer (relative value) |
|---|---|---|---|---|---|---|
| Com Ex. 5 | B3-1 | 150,000 | 0.01 D or more and less than 0.03 D | 100 | 94 | 2 |
| Example 9 | A3-1 | 150,000 | 0.03 D or more and less than 0.05 D | 88 | 88 | 5 |
| Example 10 | A3-2 | 150,000 | 0.05 D or more and less than 0.1 D | 77 | 83 | 10 |
| Example 11 | A3-3 | 150,000 | 0.1 D or more and less than 0.2 D | 75 | 87 | 20 |
| Com Ex. 6 | B3-2 | 150,000 | 0.2 D or more and less than 0.3 D | 86 | 100 | 100 |

For the electrolytic capacitors A3-1 to A3-3, the formation time of the solid electrolyte layer was short, and both the ESR 1 and the ESR 2 were reduced. For the electrolytic capacitor B3-1, in which the $X_{50}$ was less than 0.03 D, the ESR 1 was significantly increased. For the electrolytic capacitor B3-2, in which the $X_{50}$ was 0.2 D or more, the formation time of the solid electrolyte layer was long, and the ESR 2 was significantly increased.

INDUSTRIAL APPLICABILITY

The electrolytic capacitor according to the present disclosure is applicable to various uses that require a low ESR.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: anode body, 2: solid electrolyte layer, 3: cathode layer, 3*a*: carbon layer, 3*b*: metal paste layer, 4: porous body, 4*a*: first region, 4*b*: second region, 5: dielectric layer, 6: anode wire, 6*a*: first portion, 6*b*: second portion, 7: pores, 8: conductive member, 10: capacitor element, 11: exterior resin, 12: anode lead terminal, 13: cathode lead terminal, 20: electrolytic capacitor

The invention claimed is:

1. An electrolytic capacitor comprising:

an anode body including a porous body containing a valve metal, and a dielectric layer that covers the porous body; and a solid electrolyte layer that is filled in pores of the porous body and covers the dielectric layer, wherein a CV value of the porous body is less than 100,000 μF·V/g, a filling rate R of the solid electrolyte layer in the porous body decreases from an outer surface toward a center of the porous body, and a shortest distance D from the outer surface to the center of the porous body, and a distance X from the outer surface of the porous body when the filling rate R of the solid electrolyte layer is 50% satisfy a relationship of 0.1 D≤X<0.7 D.

2. The electrolytic capacitor according to claim 1, wherein the CV value of the porous body is 70,000 μF·V/g or more and less than 100,000 μF·V/g, and the filling rate R of the solid electrolyte layer when the distance X from the outer surface of the porous body is 0.1 D is 50% or more and 80% or less.

3. The electrolytic capacitor according to claim 2, wherein the CV value of the porous body is 70,000 μF·V/g or more and less than 100,000 μF·V/g, and the filling rate R of the solid electrolyte layer when the distance X from the outer surface of the porous body is 0.7 D is greater than 16% and 48% or less.

4. The electrolytic capacitor according to claim 1, wherein the CV value of the porous body is 70,000 μF·V/g or more and less than 100,000 μF·V/g, and the filling rate R of the solid electrolyte layer when the distance X from the outer surface of the porous body is 0.7 D is greater than 16% and 48% or less.

5. An electrolytic capacitor comprising:

an anode body including a porous body containing a valve metal, and a dielectric layer that covers the porous body; and a solid electrolyte layer that is filled in pores of the porous body and covers the dielectric layer, wherein a CV value of the porous body is 100,000 μF·V/g or more and less than 150,000 μF·V/g, a filling rate R of the solid electrolyte layer in the porous body decreases from an outer surface toward a center of the porous body, and a shortest distance D from the outer surface to the center of the porous body, and a distance X from the outer surface of the porous body when the filling rate R of the solid electrolyte layer is 50% satisfy a relationship of 0.05 D≤X<0.3 D.

6. The electrolytic capacitor according to claim 5, wherein the filling rate R of the solid electrolyte layer when the distance X from the outer surface of the porous body is 0.05 D is 50% or more and 83% or less.

7. The electrolytic capacitor according to claim 6, wherein the filling rate R of the solid electrolyte layer when the distance X from the outer surface of the porous body is 0.3 D is greater than 13% and 44% or less.

8. The electrolytic capacitor according to claim 5, wherein the filling rate R of the solid electrolyte layer when the distance X from the outer surface of the porous body is 0.3 D is greater than 13% and 44% or less.

9. An electrolytic capacitor comprising:

an anode body including a porous body containing a valve metal, and a dielectric layer that covers the porous body; and a solid electrolyte layer that is filled in pores of the porous body and covers the dielectric layer, wherein a CV value of the porous body is 150,000 μF·V/g or more, a filling rate R of the solid electrolyte layer in the porous body decreases from an outer surface toward a center of the porous body, and a shortest distance D from the outer surface to the center of the porous body, and a distance X from the outer surface of the porous body when the filling rate R of the solid electrolyte layer is 50% satisfy a relationship of 0.03 D≤X<0.2 D.

10. The electrolytic capacitor according to claim 9, wherein the CV value of the porous body is 150,000 μF·V/g or more, and the filling rate R of the solid electrolyte layer when the distance X from the outer surface of the porous body is 0.03 D is 56% or more and 83% or less.

11. The electrolytic capacitor according to claim 10, wherein the CV value of the porous body is 150,000 μF·V/g or more, and the filling rate R of the solid electrolyte layer when the distance X from the outer surface of the porous body is 0.2 D is 14% or more and 41% or less.

12. The electrolytic capacitor according to claim 9, wherein the CV value of the porous body is 150,000 μF·V/g or more, and the filling rate R of the solid electrolyte layer when the distance X from the outer surface of the porous body is 0.2 D is 14% or more and 41% or less.

* * * * *